July 29, 1941.  E. F. FISHER  2,250,757
GAS AND LIQUID CONTACT COLUMN
Filed Aug. 3, 1938  4 Sheets-Sheet 1

Inventor
Ernest F. Fisher

By Raymond Jones
Attorney

July 29, 1941.   E. F. FISHER   2,250,757
GAS AND LIQUID CONTACT COLUMN
Filed Aug. 3, 1938   4 Sheets-Sheet 2

Inventor
Ernest F. Fisher
By
Raymond Jones
Attorney

July 29, 1941.                    E. F. FISHER                    2,250,757
                        GAS AND LIQUID CONTACT COLUMN
                            Filed Aug. 3, 1938              4 Sheets-Sheet 4

Inventor
Ernest F. Fisher
By Raymond Jones
Attorney

Patented July 29, 1941

2,250,757

UNITED STATES PATENT OFFICE 2,250,757

GAS AND LIQUID CONTACT COLUMN

Ernest F. Fisher, Boston, Mass.

Application August 3, 1938, Serial No. 222,906

3 Claims. (Cl. 183—21)

This invention relates to a gas and liquid contact apparatus and, more particularly, to a column wherein a liquid, preferably water, may be brought into intimate contact with a gas or air whereby entrained solid particles will be taken up by a stream of the liquid which has been broken up into minute particles by the stream of gas or air to provide an efficient separation of solids from gases. The column disclosed may be used also to separate from gases various vapors that can be absorbed by the liquid brought into intimate contact with the gas.

The main object of this invention is to provide a column wherein a stream of gas is maintained in a generally spiral direction of motion close to the inner wall of the column but caused to be deflected laterally to provide a tortuous path of increased length to travel.

An equally important object is to cause a stream of gases to swirl closely adjacent the wall of a column whereby the gases will travel over a maximum path, the central axial zone of the column remaining more or less quiescent whereby the central zone may be utilized as a distinct and separate path to either convey into the column the impure gas or to lead from the column the purified gas, in which cases, a central axial tube is employed to serve as the conveyor.

Another object is to provide a gas washer column of the heavy duty type designed to handle a maximum volume of gas for a given volume or weight of column and with a relatively high efficiency, and a column which is simple but rugged in construction and economical to manufacture.

In the accompanying drawings—

Figure 1:
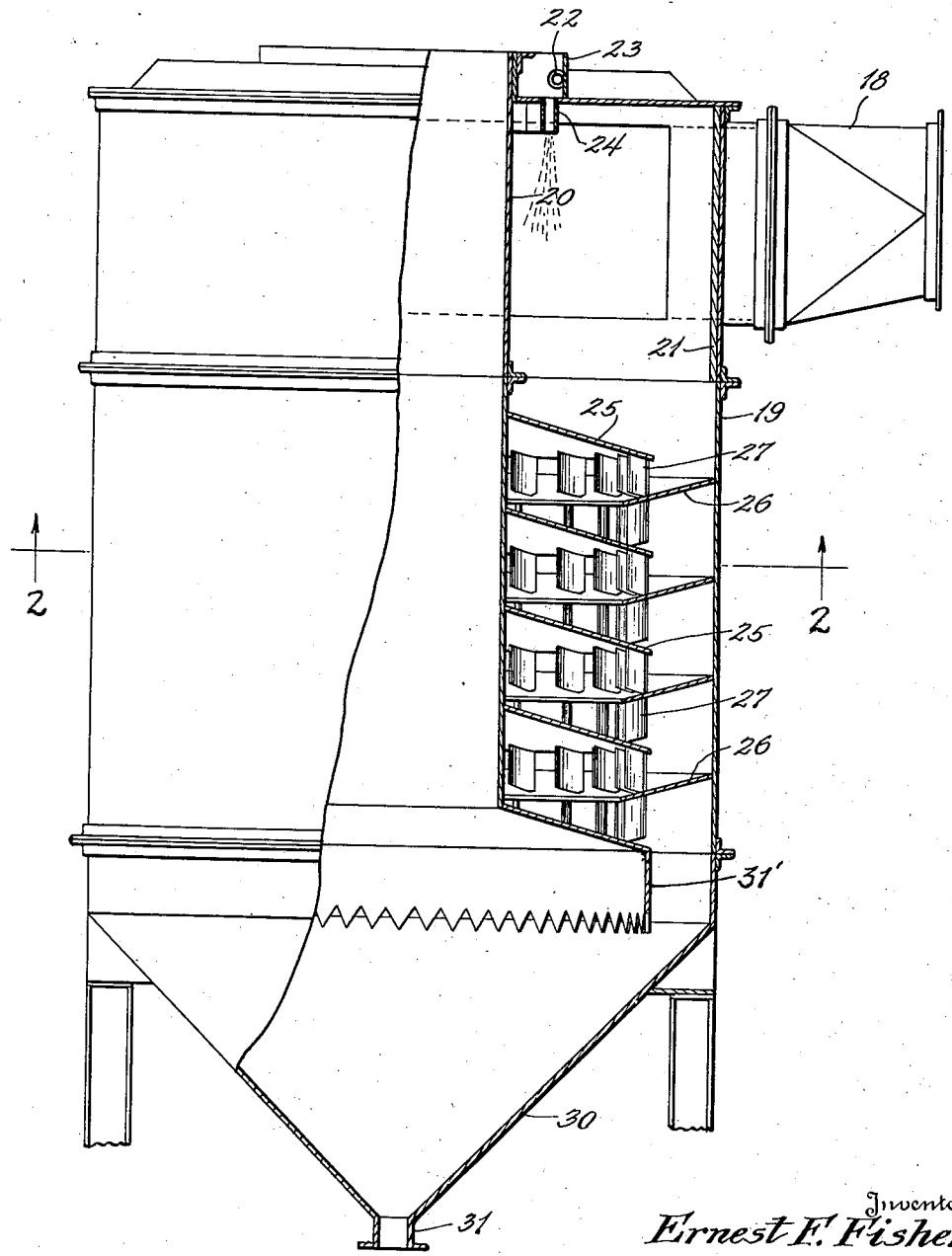
Fig. 1 is a side view partly in section of a complete column.
Figure 2:
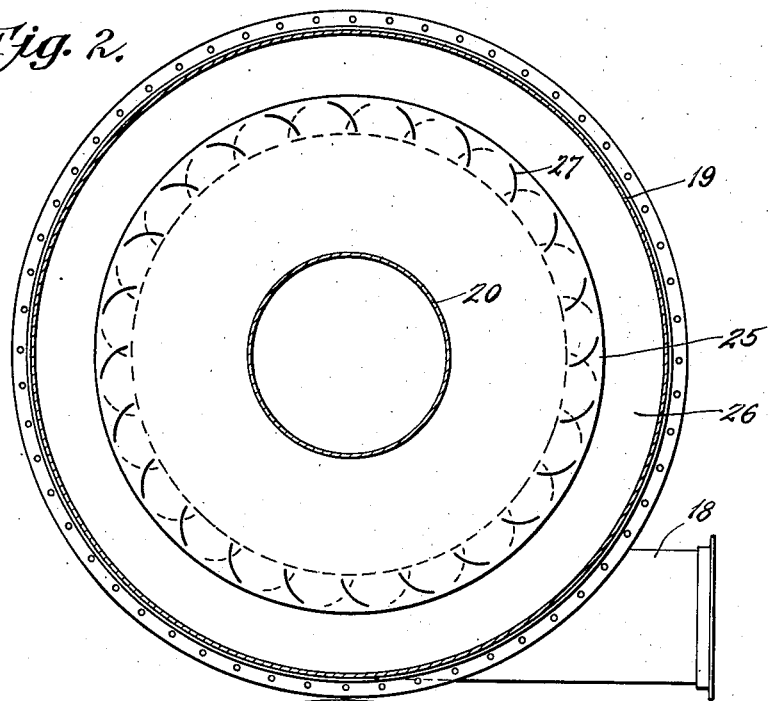
Fig. 2 is a sectional view on line 2—2 of Fig. 1.
Figure 3:
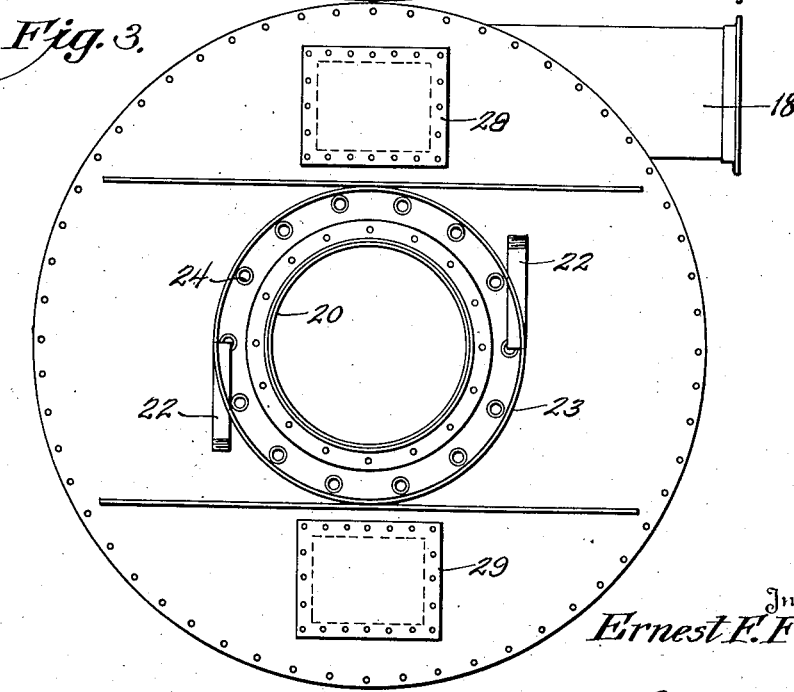
Fig. 3 is a top plan view of the device shown in Fig. 1.

Referring to Figures 1, 2 and 3 the air is drawn in through an inlet 18 positioned tangentially to the column 19 at its upper end. This air is caused to whirl tangentially around the central outlet tube 20. A wear liner 21 is positioned to receive the impact of the air adjacent the inlet to take up the wear due to impact of the solids in the air stream. Water is supplied from pipes 22 to reservoir 23 and a series of nozzles or jets 24 feeds the water to the space above a series of plates 25 secured to the tube 20, which water is broken up by the swirling air to impinge and wet the adjacent walls of the casing and tube. The water then runs down these walls onto the upper plate 25. A series of plates 26 similar to each other are secured to the inner face of the wall of column 19. The plates 25 and 26 are inclined downwardly. A series of deflector blades 27 is secured between each adjacent pair of plates 25 and 26. The water stream flows from each plate 25 or 26 and is met or cut by the stream of air flowing in the same direction in a parallel flow path. This stream of water is broken up adjacent each series of blades 27 in a manner to be later described whereby the air stream is washed of all solid matter. The clean air is drawn off through tube 20 by means of a suitable suction fan, the inlet of which is connected to the outlet end of tube 20. The blades 27 function to maintain the streams of air and liquid whirling along a helical path adjacent the wall of column 19 and away from the wall of tube 20. Clean out doors 28 and 29 are provided for an obvious purpose. The sludge water collected in the cone 30 may be drawn off from an outlet 31 as desired.

In the operation of this device the topmost row of blades 27 are inclined so as to direct the air inwardly away from the wall 19 and toward the wall of the tube 20. At the same time water draining from the reservoir 24 drains from the topmost plate 25 to the surface of the deflecting blades. The result of the combination of the drainage of the water by gravity and the force of the passage of the gases is to thoroughly wet the surfaces of the deflector blades, which wetted surfaces then entrain the solid matter carried in the gases. The curvature of the series of blades just below are so arranged that they will direct the flow of the gases outwardly away from the tube 20 and back toward the wall 19 and below the uppermost plate 26. An additional washing is given to the gases as they pass through this set of blades, inasmuch as the water passes downwardly from the uppermost deflector blades over the edge of the topmost plate 26 and thereafter over the surfaces of the deflector blades positioned just below. This process is repeated with each set of deflector blades through which the gases are made to pass.

Figure 4:
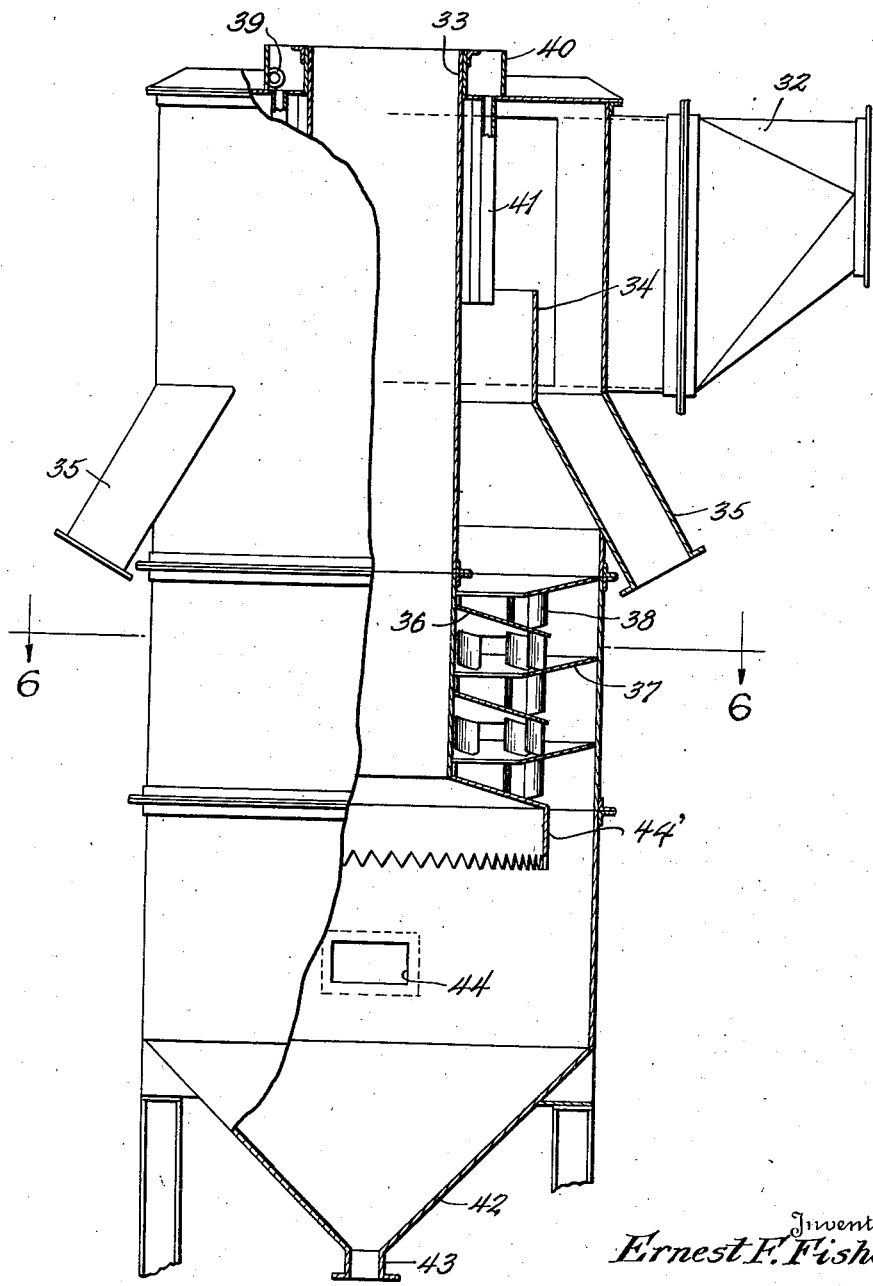
Fig. 4 is a side view partly in section of a modification.
Figure 5:
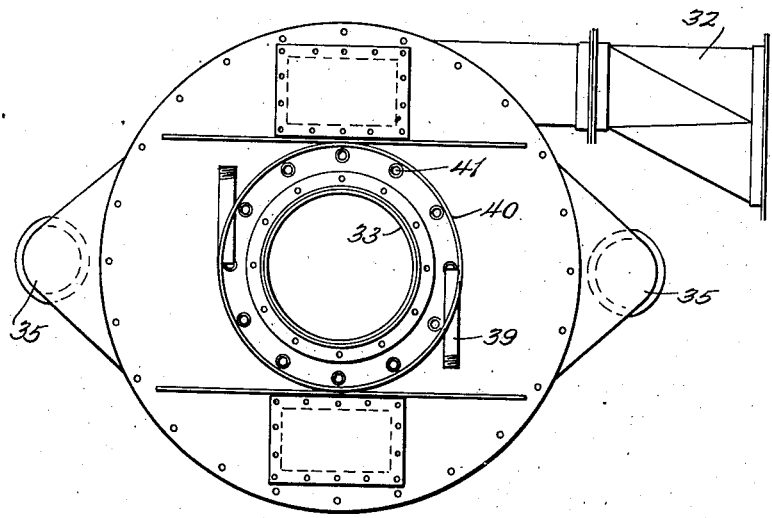
Fig. 5 is a top plan view of the device of Fig. 4.
Figure 6:
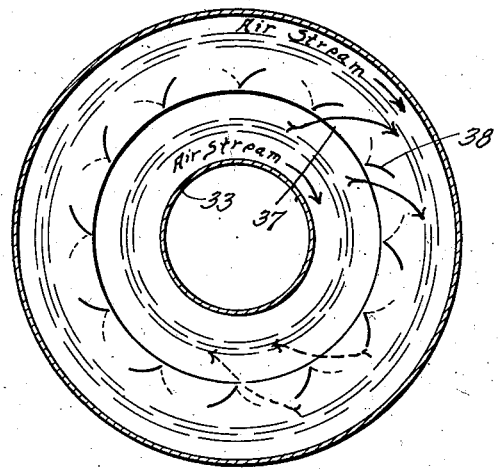
Fig. 6 is a sectional view on line 6—6 of Fig. 4.

A modified form of the column is shown in Figure 4. An impure air or gas inlet 32 is provided in the upper chamber of the column and is positioned tangentially with respect to the side wall thereof. A clean air outlet tube 33 extends from the upper end of the column and axially thereof to the lower chamber or section of said column. The upper chamber of the column is further provided with an annular baffle or shield 34 positioned concentrically in the chamber with respect to the side wall thereof. Dry dust outlets 35 extend from that portion of the upper chamber between the side wall thereof and annular baffle 34 downwardly and outwardly through the side wall of the column. A series of downwardly inclined ring-like plates 36 is secured to the outer wall surface of tube 33 and another series of plates 37 is secured to the inner wall of the column in staggered relation with respect to plates 36. Between adjacent pairs of plates 36, 37, are secured a circular series of spaced deflector blades 38 attached along their upper edges to an adjacent plate, preferably by welding. Each blade is welded at one lower corner to the next plate therebelow.

The washing liquid is fed to the column by one or more conduits 39 which feed in tangentially along the wall of a liquid reservoir 40 positioned concentrically around the upper end of the outlet tube 33. A circular series of vertical pipes 41 supply the liquid in relatively small streams to the upper chamber of the column at points positioned between the outlet tube 33 and the annular baffle 34 and below the upper edge of said baffle. This construction allows a liquid spray to flow through the column over the staggered plates 36, 37 and around deflector blades 38. A sludge cone 42 receives the mixture of liquid and solid material which flows downwardly through the column. The sludge liquid is drawn off from an outlet 43. A clean-out door 44 is provided for the cone 42.

In the operation of the apparatus shown in Fig. 4, the air or gas is drawn through the inlet 33 into the upper chamber of the column with a tangential swirling motion. The swirling motion of the impure gas and its impingement on the inner surface of the upper chamber of the column removes a portion of the solid matter from the gas. The heavier solid matter falls between the inner wall of the upper chamber and the annular baffle 34 into the dry dust outlets 35. The partially cleaned gas then flows downwardly through the column passing between the tube 33 and the annular baffle 34 where it flows concurrently with the spray of wash liquid supplied by the pipes 41. The partially cleaned gas and wash liquid are then thoroughly commingled by the baffling action of the staggered plates 36, 37 and blades 38 in the manner hereinbefore described, in connection with Fig. 1. The sludge of wash liquid and solid matter flows into the lower chamber of the column over its side wall and thence to the sludge cone. The clean air is separated from the wash liquid in the lower chamber of the column and passes into the outlet tube and flows upwardly therethrough. As described for the other forms of the apparatus, a suction fan is employed to draw off the clean air or gas from the tube 33.

In the various modifications shown, air is forced through the column by means of a blower or suction fan which draws the pure air from the outlet conduit, hence such fan does not handle any dust laden air. As a result, the life of the fan is prolonged and maintenance costs are considerably reduced.

This apparatus embodies new and proven principles covering the separation of dust particles from air by washing with water. It employs centrifugal force with water traveling at high velocity to obtain the scrubbing and impinging action so necessary to remove the dust from the air with a minimum of power.

The dust laden air enters the top of the device shown in Fig. 1 tangentially and immediately the entire dust load receives an initial wetting during its whirl in the top part of the collector. The large wetted particles of dust serve as carriers of the fine hard to wet dust particles, much in the same manner that fine dust clings to wetted sawdust as it is swept along the floor.

This action continues helically downward through the collector and, as the water and air pass simultaneously through each bladed section, the water is broken up into a fine spray which washes with a vigorous scrubbing action every particle of surface, leaving no corner where dust can remain for an instant. The spiral path of the air and water ends finally in the bottom of the collector where all the dust is deposited as sludge and the cleansed air passes out through the axial tube which is connected with the fan suction. There are no dead zones in the device where dust can collect and remain to clog. No solid particles of water can pass out with the air as all of the water is separated from the air by centrifugal force in the bottom of the collector. The axial tube in the device eliminates a dead zone in the center of the collector where fine dust would naturally find rest and compels this dust to travel at high velocity with the heavier dust particles and become subjected to the same centrifugal force and scrubbing action of the water. The axial tube also provides an outlet for the cleaned air at a point of least turbulence in the forms shown in Figs. 1 and 4.

A circular liquid eliminator plate 31' in Fig. 1 or 44' in Fig. 4 is mounted to depend from the lowermost plate of the inner series of plates. This plate is provided with a series of points or the like around its lower edge. The major portion of the water falling off from this lowermost plate or from thereabove is separated from the gas stream by centrifugal force to impinge the inner casing wall and flow downwardly therealong. Any water that is not thrown off from this plate tends to run down the eliminator plate and collect on said points in large drops which are not picked up by the gas stream which is at a lower velocity at this point.

Figure 7:
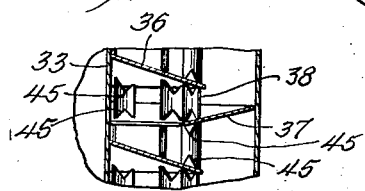
Fig. 7 shows a modified form of blade.

Figure 7 shows a modified form of vertical deflector blade wherein notches 45 are provided centrally of each upper and lower edge of the blade. Each notch provides a space under these edges so that the water may get thereunder and wash the adjacent pocket clear of any accumulation of sludge. Only two points of each blade end edge bear on a respective supporting plate in a manner to facilitate welding the blade to the plate.

This improved construction imposes the least resistance to the flow of air through the device, consequently the back pressure is less than 2½ inches of water and remains constant during the operation of the unit.

While the various forms of the apparatus disclosed have been described as adapted to separate vapors and solids from gases, it is intended that the apparatus should not be limited to that use. It is within the scope of this disclosure and appended claims that the apparatus shall be susceptible to other uses and applications, for example, as a cooling tower for cooling liquids.

I claim:

1. A column comprising a cylindrical outer wall, a conduit extending within and coaxially of said wall, both ends of said conduit being open with the lower end thereof in communication with the space between the conduit and wall, sets of vertically spaced superposed plates secured respectively to the inner face of the wall and outer face of the conduit, the sets of opposed plates being staggered with respect to each other, a set of circumferentially arranged spaced deflector blades positioned between each adjacent opposed pair of plates adjacent the free ends thereof, said wall having a gas passage therethrough adjacent the upper end thereof, a tangentially arranged conduit communicating with the gas passage, a series of liquid supply pipes for supplying liquid to the space above all of the superposed plates, a vertically extending shield positioned between said pipes and the column wall, said shield being effective to maintain separate the liquid stream from said pipes and solid particles which separate from the gas stream along the column wall adjacent the inlet gas passage.

2. In a gas cleaning apparatus, an upright cylindrical casing provided with a gas outlet at the top, an axial outlet tube depending from said outlet to a space within the lower portion of said casing, a plurality of annular disc-shaped plates extending inwardly from the wall of the casing, a plurality of similar plates extending outwardly from said tube between and in staggered relation to said first named plates, a tangential gas inlet to said casing above said plates, an annular series of vertically disposed curved deflecting blades extending between each pair of plates, said plates and said blades being arranged in association with the wall of said casing and said tube to confine the gases to a continuous path from said inlet to said space, and means to supply liquid to the upper surface of an upper plate so that gravity and the flow of gases distribute said liquid over the surfaces of said blades.

3. In a column as set forth in claim 2, wherein the blade sets are curved alternately in succession, one set of an adjacent pair of sets to deflect gas passing therethrough towards the column wall and the other set of the pair towards the conduit wall and in a manner to cause the stream of gas to whirl in a helical path on both sides of the blade sets from one end of the gas washing space to the other end thereof.

ERNEST F. FISHER.